(No Model.)
A. N. BLISS.
Soldering Implement.
No. 242,869.  Patented June 14, 1881.
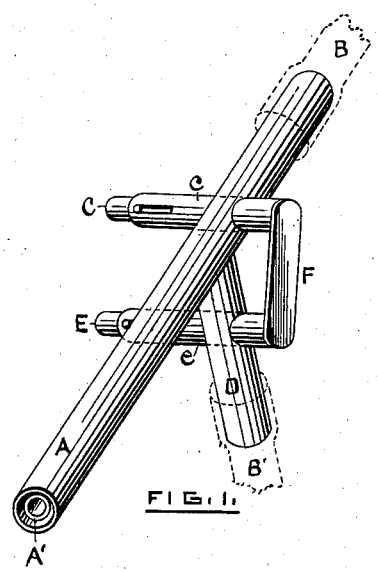
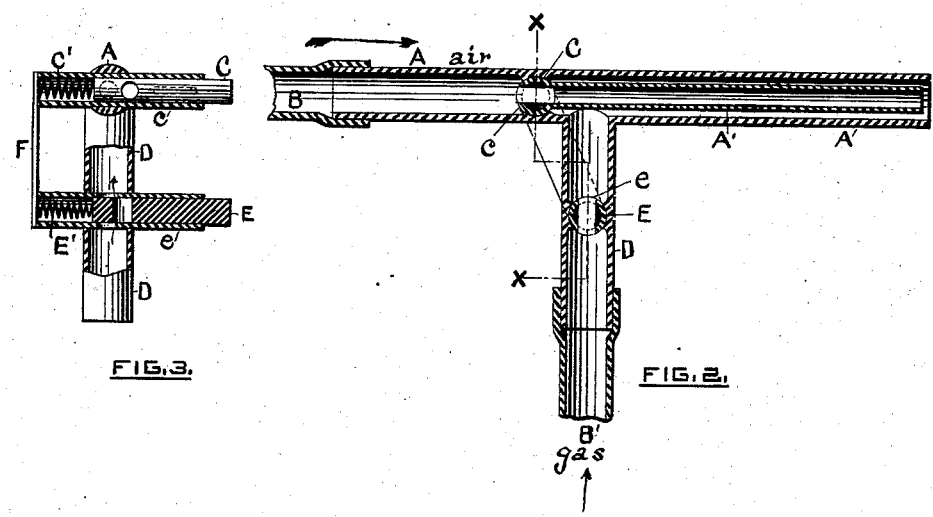
WITNESSES,
Thomas B. Ross.
Geo. W. Cady.
INVENTOR,
Albert N. Bliss,
by Edson Salisbury Jones
Attorney.

UNITED STATES PATENT OFFICE.

ALBERT N. BLISS, OF ATTLEBOROUGH, MASSACHUSETTS, ASSIGNOR OF ONE-HALF TO FRANK FONTNEAU, OF SAME PLACE.

SOLDERING IMPLEMENT.

SPECIFICATION forming part of Letters Patent No. 242,869, dated June 14, 1881.

Application filed March 19, 1881. (No model.)

*To all whom it may concern:*

Be it known that I, ALBERT N. BLISS, of Attleborough, in the county of Bristol and State of Massachusetts, have invented a new and useful Soldering Implement; and I do hereby declare that the following specification, taken in connection with the accompanying drawings, forming a part of the same, is a full, clear, and exact description thereof.

My invention relates to a soldering implement for the use of jewelers and other artisans, which is adapted to be manipulated by the hand; and it consists in a device combining a gas-tube and an air-blast tube, both of which are arranged to be connected with their respective supply-pipes, each of said tubes being provided with a self-closing valve, by means of which the amount of gas and air issuing from the implement can be conveniently and instantly varied and governed, and the character of the flame thereby be regulated to the requirements of the work being treated.

Referring to the drawings, Figure 1 shows my improved implement in perspective. Fig. 2 represents the same in longitudinal section; and Fig. 3 shows an end view in partial section on line $x\ x$.

A is a tube, which is arranged at its rear end to be connected with an air-blast supply-pipe by means of a flexible pipe, B. This tube is provided with a valve, C, which opens into a smaller tube, A', as shown in Fig. 2, which extends toward the mouth of the tube A, is concentric therewith, and delivers the air under pressure.

Connected with the tube A is a tube, D, whose free end is arranged to be connected with a gas-supply pipe by a flexible pipe, B'. The tube D enters the tube A between the mouth of the latter and its valve C, as shown in Fig. 2, and is provided with a valve, E, to govern the amount of gas which is to enter the tube A and escape from its mouth. The valves C E are respectively inclosed in sleeves $c\ e$, which project outward from the tubes, and each valve is preferably supplied with a pin, and its sleeve with a slot, as shown in Fig. 1, to limit the movements of the valves. Located in the respective sleeves, and bearing against their rear ends and the rear ends of the valves, are springs C' E', Fig. 3, which close the valves when pressure is removed from their outer ends.

For conveniently holding the implement the rear ends of the sleeves are preferably connected by a plate, F, against which the thumb may rest, while the fingers are applied to the valve-heads, and the implement thus be held in the hand.

The valve E is a "leak-valve"—that is, it allows a small quantity of gas to escape when the valve is closed, in order that a flame may always be preserved at the mouth of the device; but the valve C is preferably tightly closed by its spring. When, therefore, the springs are allowed to act to their greatest extent E will diminish the quantity of gas to a minimum, and C will shut off the air-blast entirely.

In using the implement it is held in the hand, the thumb resting on the plate F, and two of the fingers on the valve-heads, and it may be moved over the work and perform its office, since the flexible connecting-pipes will allow of and furnish supplies of gas and air during such movement.

A convenient implement is provided, therefore, which is adapted either to hard or soft soldering, and by which the intensity of the heat of the flame issuing from it can be instantly varied and governed, according to the requirements of the work.

Although I prefer to use the device as a hand implement capable of being moved in any direction over the work, yet it may be rigidly attached to some object, or be so secured that it may be turned in various planes upon a pivot and the work be moved in front of it.

I have shown and described the tubes in what I deem to be a preferred relation; but their relative positions may be changed without departing from the spirit of my invention.

What I claim as my invention, and desire to secure by Letters Patent, is—

1. In a soldering implement, the combination of a gas-tube provided with an automatically-closing valve, and an air-blast tube provided with an automatically-closing valve, substantially as set forth.

2. A soldering implement combining a gas-tube and an air-blast tube, each of which is provided with a self-closing valve arranged to be operated independently of the other, substantially as set forth.

3. A soldering implement composed of and combining a gas-tube, an air-blast tube, and spring-valves, which are located in said tubes and in such relation to each other that they can be controlled at the same time by the fingers of one hand, and thereby govern the flame issuing from the implement, and which, when released, will shut off the air-blast and diminish the flow of gas, substantially as set forth.

4. The combination of the tubes A, A', and D, and the spring-valves C E, substantially as and for the purposes specified.

ALBERT N. BLISS.

Witnesses:
EDSON SALISBURY JONES,
GEO. W. CADY.